T. Freeman.
Churn.

No. 112,332.   Patented Mar. 7, 1871.

Witnesses:
J. F. Colby
R. H. Marsh

Inventor:
Thompson Freeman
Pr. D. C. Colby & Son
Attorneys

United States Patent Office.

THOMPSON FREEMAN, OF WESTFIELD, ILLINOIS.

Letters Patent No. 112,332, dated March 7, 1871.

IMPROVEMENT IN CHURNS.

The Schedule referred to in these Letters Patent and making part of the same.

*To whom it may concern:*

Be it known that I, THOMPSON FREEMAN, of Westfield, in the county of Clark and State of Illinois, have, as I believe, invented new and useful Improvements in Churns for the Butter-Dairy; and I do hereby declare the following to be a full and exact description of the same, reference being had to the drawings that accompany and form a part of this specification.

Figure 1:
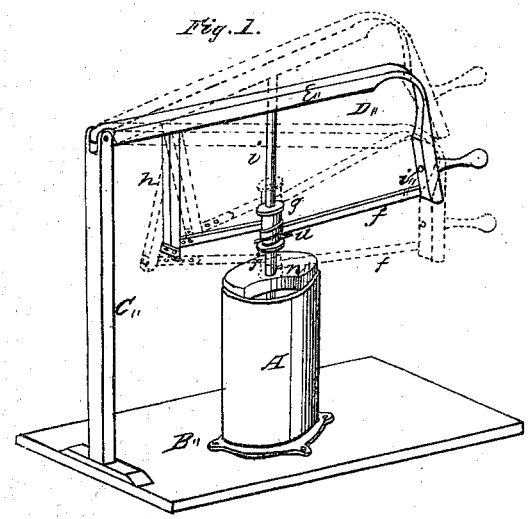

Figure 1, view of the churn as it stands ready for use.

Figure 2:
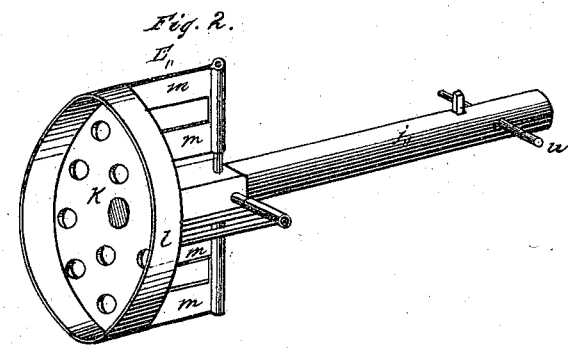

Figure 2, view of the interior parts, detached.

The object of my invention is to produce the greatest amount of violent agitation of the cream for any given force employed, and in such manner as not to pound or strike the cream forcibly, thus avoiding the mashing of the granules, which mashing always renders butter salvey and like lard in spreading.

A represents an ordinary upright cream-box, and may be square, cylindrical, or of other convenient form.

B, base, to which the box A may be attached in any suitable way to retain it in place.

C, a standard, rising from one end of the base B.

D, a frame, the style and arrangement of which may be seen in fig. 1 of the drawings.

E, churn-dash, which is operated through the frame D, as fully explained hereinafter.

*f*, a strap arranged to extend from the lower end of the bent bar of the frame D, at *v*, passing once around the drum *g* to the lower end of the bar *h*, where it fastens over a pin and may be drawn tightly or left more loosely, as may be required.

*g*, a drum, fastened firmly to the rod *i*, and has an opening at its lower end for the upper end of the dash-rod *j*, which is fastened in place by the pin *u*.

*k*, disk of the dasher, perforated with more or less holes.

*l*, a rim upon the disk *k*, extending below the lower surface of this disk.

*m m*, a series of upright bars, more or less in number, for agitating the cream.

*n*, the cover to the cream-box, part of it broken away.

*o*, the working-handle.

The joint of the rod *i*, with the bent bar of the frame at *w*, is a flexible universal one, to allow the outer end of the frame to be worked up and down, as indicated by the dotted lines in red in fig. 1.

The end of the bent bar at the top of the standard C turns on the pin *x*.

The operation is as follows:

Force applied to the working-handle *o*, to lift and depress it in rapid succession, not only raises and depresses the dasher within the churn-box, but also, through the action of the strap *f*, rotates it horizontally backward and forward very rapidly.

Thus, while the bottom plane of the disk *k* cannot be brought forcibly onto the bottom of the churn-box to mash the granules, the height to which the dasher is brought is easily regulated to terminate below the surface of the cream, so it will not strike a blow in descending and break granules in that way.

The violent agitation into which the cream is thrown by the combined action of the alternating vertical motion and the reciprocating rotary motion of the dasher wears out the skins of the little sacks that hold the granules of butter in an incredibly short space of time, producing butter of very superior quality, being in no way injured by violent concussion or long-continued pounding.

I do not confine myself to the exact methods of structure, or modes of connecting the different parts as set forth and described, other equivalent devices for these purposes being a matter of choice.

What I do claim as of my invention, and desire to secure by Letters Patent, is—

The reciprocating frame, consisting of the bent bar *e*, with handle and shoulder-piece *h*, having the strap *f*, in combination with the drum *g*, rod *i*, dasher-handle *j*, connected by pin *u*, and churn A, for the purpose of obtaining a combined reciprocating and rotary motion of the dasher, substantially as described.

In testimony whereof I have signed my name to this specification in the presence of two subscribing witnesses.

THOMPSON FREEMAN.

Witnesses:
R. S. BRISCOE,
J. F. BROWN.